United States Patent [19]

Fogler

[11] Patent Number: 4,630,246

[45] Date of Patent: Dec. 16, 1986

[54] SEISMIC-ACOUSTIC LOW-FLYING AIRCRAFT DETECTOR

[75] Inventor: Robert J. Fogler, Albuquerque, N. Mex.

[73] Assignee: The United States of America as represented by the Secretary of the Air Force, Washington, D.C.

[21] Appl. No.: 623,586

[22] Filed: Jun. 22, 1984

[51] Int. Cl.⁴ .......................... H04B 1/10; G01S 3/82; G08B 19/00; G08B 13/26

[52] U.S. Cl. ..................................... 367/135; 367/45; 367/46; 367/124; 367/125; 367/126; 367/136; 340/522; 340/566

[58] Field of Search .................... 367/45, 46, 135, 136, 367/117, 124, 125, 126, 906; 340/522, 566; 181/125; 364/421

[56] References Cited

U.S. PATENT DOCUMENTS

| | | | |
|---|---|---|---|
| 3,573,817 | 4/1971 | Akers | 340/420 |
| 3,774,190 | 11/1973 | Kyle, Jr. | 340/258 R |
| 3,852,706 | 12/1974 | Barney et al. | 340/6 R |
| 4,083,031 | 4/1978 | Pharo, Jr. | 340/5 R |
| 4,223,304 | 9/1980 | Barowitz et al. | 340/566 |
| 4,408,533 | 10/1983 | Owen et al. | 102/211 |

Primary Examiner—John F. Terapane
Assistant Examiner—Eric Jorgensen
Attorney, Agent, or Firm—Donald J. Singer; Willard R. Matthews; William G. Auton

[57] ABSTRACT

The detection of low-flying aircraft is accomplished using both a microphone and geophone as sensors and a signal processing system for measuring the correlation between the seismic and acoustic signals. The signal processing system contains two amplification and bandlimiting circuits, a delay circuit, an adaptive noise cancelling circuit, two signal smoothing circuits and a comparison circuit. The two amplification and bandlimiting circuits enhance a selected portion of the seismic and acoustic signals received by the sensors. The optional delay circuit is applied to the input acoustic signal, allowing the user the option of sensing or rejecting the detection of jet aircraft. The adaptive noise cancelling circuit generates an error signal by subtracting the signal components which are correlated between the seismic and acoustic signals from the input seismic signal. The first signal smoothing circuit improves the quality of the input seismic signal for comparison. The second signal smoothing circuit improves the quality of the error signal generated by the adaptive noise cancelling circuit. Finally, the comparison signal compares the smoothed seismic signal with the error signal. Low-flying aircraft have seismic and acoustic signatures which are highly correlated while other sources (wind, seismic events and motor vehicles) have little correlation. Therefore, if the error signal resembles the seismic signal there occured little correlation and the causing the event was not an aircraft. Dissimilar error signals and seismic signals occur when aircraft are detected, an event which is indicated by the output signal from the comparison circuit.

12 Claims, 6 Drawing Figures

SEISMIC-ACOUSTIC LOW-FLYING AIRCRAFT DETECTOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to a detection system for low flying aircraft and specifically to a combination of seismic and acoustic sensing capable of detecting low flying aircraft by correlating their seismic and acoustic signatures.

Conventional radio frequency (r.f.) radar systems possess certain natural limitations in the detection of low flying aircraft. Terrain echo returns have increasingly greater tendencies to obscure tracking of aircraft as they approach the ground. Certain aircraft will intentionally take advantage of this limitation and fly low to avoid the radar of law enforcement agencies, border patrol officials, and military facility protection systems.

Several alternatives to radar systems have already been tried. Past attempts to detect aircraft with microphones by analyzing aircraft acoustic signatures have suffered from false alarm problems caused by other sources of acoustic noise such as motor vehicles and wind. The use of geophones alone has been subject to false alarms caused by other sources of seismic signals.

Another solution to the low flying aircraft detection problem is the use of both a geophone and a microphone in a sensing system. This task has been alleviated to some degree by prior art techniques. The extent of these prior art techniques is given by the following three technical reports: Sandia Laboratories, September 1973, C. L. Schuster and J. E. Scheibner, "A Low-cost-to-produce Unattended Ground Sensor", J. P. Claassen and M. M. Patterson, "A Comparitive Study of Adaptive Noise Cancellation Algorithms for Intrusion Detection Systems", Proceedings of the 24th Midwest Symposium, June 29–30, 1981, Albuquerque, NM, B. Widrow, et al, "Adaptive Noise Cancelling: Principles and Applications", Proc. IEEE, Vol. 63, No. 12, December 1975, pp. 1692–1716.

One known approach consists of a system of detecting personnel, land vehicles, propeller and jet aircraft thru the use of a geophone and a microphone. The above detection system accomplishes classification by a comparison of energy levels between the seismic and acoustic signals occuring in certain frequency bands (e.g. the seismic signal of a land vehicle or a pedestrian at $50H_z$ is presumed to be greater in magnitude than its acoustic signal; while an aircraft acoustic signal at $50H_z$ is presumed to be greater in magnitude than its seismic signal etc.)

While the classifier logic of the prior art detection system described above is successful in distinguishing between land and air vehicles under a limited set of conditions, it remains inadequate for purposes of the detection of aircraft in that it remains subject to false alarms in the form of other types of acoustic signals which would satisfy the classifier logic requirements yet are not aircraft.

The prior art device compares the energy levels of seismic and acoustic signals and classifies the source of the signals using the classification logic partially described above. The subject invention incorporates the advent of two new phenomena into an aircraft detection principle. First, it has been determined that the seismic and acoustic signatures for low-flying aircraft have substantial correlation at large target-to-sensor distances. Second, it has been determined that there exists extremely little correlation between the seismic and acoustic signals generated by wind, seismic events, and land vehicles in motion.

The technical reports of both Widrow et al, Claassen and Patterson describe prior art alternative noise cancellation algorithms and devices which may be successively used as one element of the subject invention: the adaptive noise canceller. The detection of aircraft by determining the degree of correlation between seismic and acoustic signals and the application of an adaptive noise canceller as a means to that end is in a manner different from the prior art.

In view of the foregoing, it is apparent that there currently exists the need for a detection system of low-flying aircraft which senses the presence of aircraft by the phenomenon of the correlation between their seismic and acoustic signals. The present invention is directed towards satisfying that need.

SUMMARY OF THE INVENTION

This invention provides a means of detecting low flying aircraft by comparing and correlating their seismic and acoustic signatures.

In order to compare and correlate seismic and acoustic signals, the present invention uses: a microphone and geophone, two amplification and bandlimiting circuits, a delay circuit, an adaptive noise cancelling circuit, two squared magnitude estimator circuits, a circuit which obtains a ratio or a difference of its inputs, and a comparison circuit.

In operation, the microphone and geophone act as sensors. The two amplification and bandlimiting circuits enhance a selected portion of the seismic and acoustic signals received by the sensors. The optional delay circuit allows the user the option of sensing or rejecting the detection of jet aircraft. The adaptive noise cancelling circuit, with a subtractor, generates an error signal by removing the signal components which are correlated between the seismic and acoustic signals from the input seismic signal. The first squared magnitude estimator circuit produces a smoothed estimate of the input seismic signal power. The second squared magnitude estimator circuit produces a smoothed estimate of the signal power of the error signal generated by the adaptive noise cancelling circuit.

The error signal is the seismic signal minus its signal components which are correlated with the acoustic signal. Therefore, if the original event was one that has little correlation between the seismic and acoustic signals (wind, land vehicles etc) the input seismic signal power and the error signal power would be nearly the same. However, if the original event was a low flying aircraft which has substantial correlation between seismic and acoustic signals, the input seismic signal power would be significantly larger than the error signal power. Therefore, either the ratio or the difference of the input seismic signal power estimate the error signal power estimate can be compared to a threshold value to yield a decision output.

In another embodiment, the above invention can be modified by deleting the first and second squared magnitude estimators and including a squared magnitude extimator between the output of the differencer and the input of the comparison circuit. The differencer produces a signal which may be available directly from certain types of adaptive noise cancellers which would make it redundant.

This embodiment is slightly simpler than the first embodiment but may not detect as well.

In both embodiments the roles of the geophone and the microphone may be reversed. Furthermore, with the addition of analog-to-digital conversion circuits after both amplify and bandlimit circuits, the functions of the remaining circuits can be performed digitally by a microcomputer.

It is a principal object of the invention to provide a new and improved means of detection of low-flying aircraft.

It is another object of the invention to provide a detection system which distinguishes aircraft by correlating their seismic and acoustic signatures.

It is another object of the invention to provide an aircraft detection system in which the user has the option of detecting or rejecting jet aircraft.

It is another object of the invention to provide an aircraft detection system in which the user may vary the distance thresholds for a detection.

These, together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The invention provides a means of detecting low flying aircraft by correlating their seismic and acoustic signatures.

In order to correlate seismic and acoustic signals, the present invention uses: microphone and geophone as sensors, two amplification and band limiting circuits, a time delay, an adaptive noise canceller, two squared magnitude estimators, a ratio, and a comparison.

Figure 1:
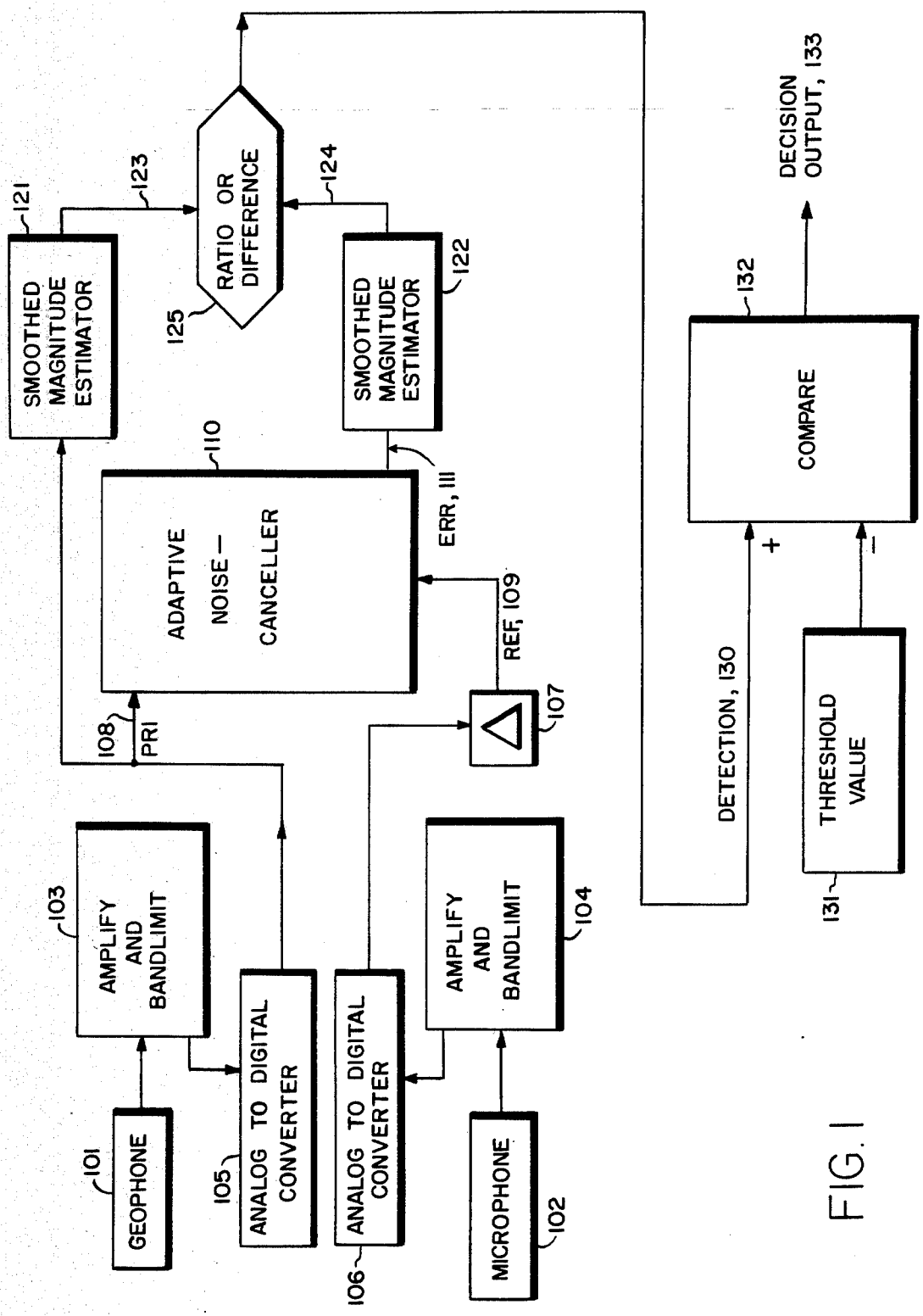
FIG. 1 is a functional block diagram of an embodiment of the invention.

FIG. 1 is a functional block diagram of one embodiment of the invention. As mentioned above, the sensors for this aircraft detection system consists of a geophone 101 and a microphone 102. Both sensors 101 and 102 are available in many varieties as commercial-off-the-shelf items. The microphone should be capable of responding to acoustic signals in the 10 to 200 Hz frequency range. The geophone 101 should operate in the same frequency range as the microphone 102. The seismic and acoustic signals from geophone 101 and microphone 102 are each processed by amplifier and band limiting circuits 103 and 104, then converted into digital by Analog-to-Digital converters 105 and 106. In the embodiment the seismic signal is amplified by an 80 db gain by amplifier and band limiting circuit 103 and the acoustic signal is amplified by a 45 db gain by amplifier and bandlimiting circuit 104. The band limiting function of amplifier and bandlimiting circuits 103 and 104 is accomplished by low pass filters which permit signals from 10 Hz to 200 Hz to pass through. The purpose of the cutoff at 10 Hz is to eliminate low frequency wind noise. The cutoff at 200 Hz is imposed since the frequencies of interest occur at 200 Hz and below. In the embodiment the amplified and bandlimited analog signals are sampled and converted to digital signals by analog-to-digital circuits 105 and 106 allowing all subsequent functions to be performed by arithmetic operations in a microcomputer. The analog-to-digital conversion is accomplished with 12-bit twos complement successive approximation analog-to-digital converters and sample-and-hold amplifiers. Both the analog-to-digital converter circuits and the microcomputer are available in many varieties as commercial off-the-shelf items. Item 107 is a time delay circuit in which $\Delta$ represents an optional delay time. It $\Delta=0$ (no delay), the configuration is capable of detecting all types of aircraft. If $\Delta$ is greater than zero and of sufficient length, the configuration will reject jet aircraft but will detect aircraft which have one or more propellers. This is because low-flying propeller aircraft (including helicopters) generate seismic and acoustic signals which are correlated at several time lags but jet aircraft signals are correlated only at zero or near zero time lag. Thus, by delaying one of the signals a sufficient length of time, $\Delta$, the noise-canceller is not able to find substantial correlation between seismic and acoustic signals from jet aircraft, but is able to find substantial correlation between seismic and acoustic signals from propeller aircraft. A typical value for $\Delta$ is 0.25 seconds.

Time delay 107, therefore, delays the acoustic signal to provide reference signal 109.

The adaptive noise canceller, 110, represents a particular adaptive filter configuration that has the ability to remove from a signal present at its primary input those signal components which are correlated with a second signal present at its reference input. If the reference signal is not correlated with the primary signal, the primary signal passes through the noise-canceller virtually unaltered. Thus, for example, if a seismic signal is input to the primary channel and an acoustic signal is input to the reference channel, and only wind noise is present in both signals, the output error signal of the noise-canceller will resemble the seismic signal at its input. If helicopter noise is present in both the seismic and acoustic signals, the noise-canceller will remove from the seismic signal those signal components which are correlated with the acoustic signal. The output of the noise-canceller is much smaller than the seismic signal at its primary input since the correlated signal components are removed by the canceller. By comparing the signal energy at the primary input with the output of the canceller, the presence of aircraft noise can be detected.

Figure 5:
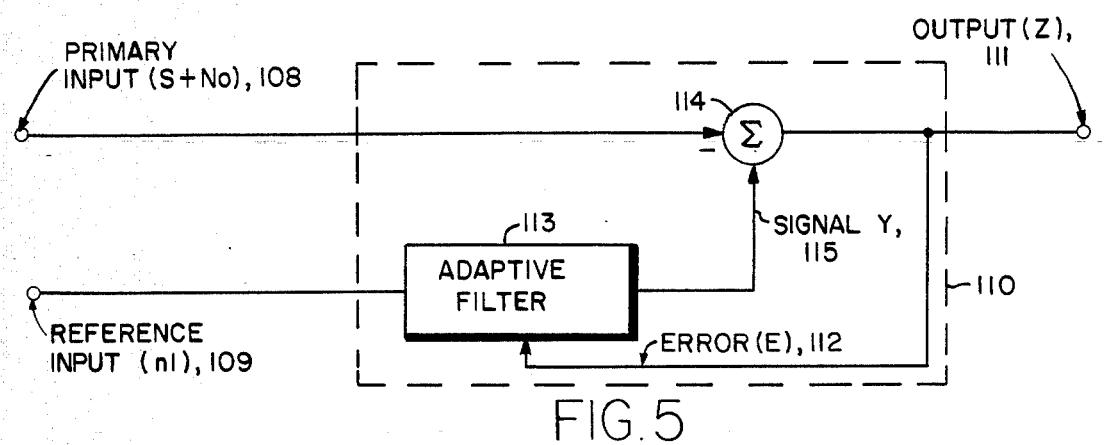
FIG. 5 is an illustration of a prior art adaptive noise canceller.

Several state-of-the-art adaptive noise cancellers are currently available and would satisfy the requirement of the adaptive filter 110. One such adaptive noise canceller is illustrated in FIG. 5, and will be explained in a discussion of that FIGURE.

Adaptive noise canceller 110 receives the reference signal 109 produced by delay 107 from analog-to-digital converter circuit 106 as well as the primary signal 108 from the amplifier and band limiting circuit 103 and generates the error signal 111. This error signal 111 is the primary signal 108 minus the signal components which are correlated between the primary signal 108 and the reference signal 109.

Squared magnitude estimator 121 squares the primary signal 108 and low-pass filters the result producing the seismic signal power estimate 123. Squared magnitude estimator 122 functions identically to 121 producing the error signal power estimate 124. Digital low-pass filters are common in the art. The ratio 125 is performed by arithmetic division of the seismic signal power estimate 123 by the error signal power estimate 124 producing the detector signal 130. The detector signal is compared with a threshold value 131 resulting in a two-valued decision output 133. As as example, a decision output at logic 0 would indicate that the ratio of the primary signal power estimate 123 to the error signal power estimate 124 was less than the threshold value 131 indicating that insufficient correlations exists between the input seismic and acoustic signals and therefore the event which caused the signals was not a low flying aircraft. A decision output at logic 1 would indicate that the ratio of the primary signal power estimate 123 to the error signal power estimate 124 was greater than the threshold value 131 indicating that substantial correlation exists between the input seismic and acoustic signals and therefore the event which caused the signals was a low flying aircraft.

Figure 2:
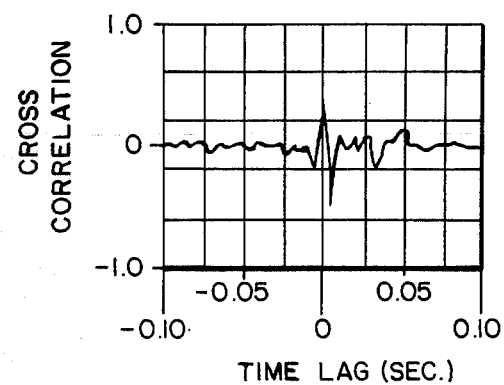
FIG. 2 is a graph of the correlation between the seismic and acoustic signatures of jet aircraft.
Figure 3:
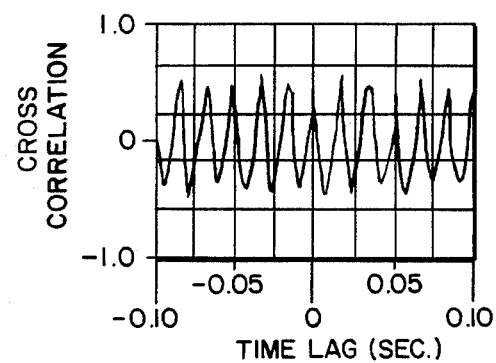
FIG. 3 is a graph of the correlation between the seismic and acoustic signatures of helicopter aircraft.
Figure 4:
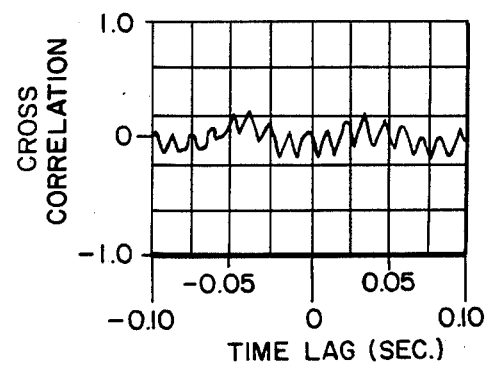
FIG. 4 is a graph of the correlation between the seismic and acoustic signatures of fixed wing propeller aircraft.

FIGS. 2, 3 and 4 are graphs of the typical correlation between the seismic and acoustic signatures of various aircraft. The horizontal axis of each graph represents a measure of time lag between seismic and acoustic signals in seconds. The vertical axis of each graph represents the measure of cross correlation between the seismic signals and acoustic signals normalized by the square root of the product of their variances which were produced by low-flying aircraft using a geophone and microphone as sensors.

FIG. 2 contains a plot of the correlation between the seismic and acoustic signatures observed for jet aircraft. The plot in FIG. 2 contains one large peak. As discussed above, if the optional delay 107 of FIG. 1 has a delay of 0.25 seconds placed on the incoming acoustic signal, then the configuration will reject jet aircraft, but will detect aircraft having propellers. This is because propeller aircraft generate seismic and acoustic signals which are correlated at several time lags, but jet aircraft signals are correlated only at zero or near zero time lag.

FIG. 3 contains a plot of the correlation between the seismic and acoustic signatures of helicopter aircraft. The axis of the graph are as described above and the correlation has several large peaks.

FIG. 4 contains a plot of the correlation between the seismic and acoustic signatures of fixed wing propeller aircraft. The axis of the graph are as described above and the correlation plot is distinguished by having several medium-sized peaks.

FIG. 5 is an illustration of a prior art adaptive noise canceller 110 which receives the primary signal 108 and reference signal 109 and produces an output error signal 111. Signal 111 equals the primary signal minus the signal components correlated between primary signal 108 and reference signal 109. The noise canceller accomplishes this through the use of an adaptive filter 113, a summing junction 114, and a feed back loop which returns the error 112 produced by summing junction 114 to adaptive filter 113.

FIG. 5 shows the basic problem and the adaptive noise cancelling solution to it. A signal s is transmitted over a channel to a sensor that also receives a noise $n_o$ which is uncorrelated with the signal s. The combined signal and noise $s+n_o$ form the primary input to the canceller. A second sensor receives a noise $n_1$ which becomes the reference signal 109 which is uncorrelated with the signal s but correlated in some unknown way with the noise $n_o$. This sensor provides the reference input to the canceller. The noise $n_1$ is filtered to produce an output 115, y that is as close a replica as possible of $n_o$. This output is subtracted from the primary input $s+n_o$ to produce the adaptive noise cancelling circuit output signall 111, $z=s+n_o-y$.

If one knew the characteristics of the channels over which the noise was transmitted to the primary and reference sensors, it would theoretically be possible to design a fixed filter capable of changing $n_1$ into $n_o$. The filter output could then be subtracted from the primary input, and the system output would be signal alone. Since, however, the characteristics of the transmission paths are as a rule unknown or known only approximately and are seldom of a fixed nature, the use of a fixed filter is not feasible. Moreover, even if a fixed filter were feasible, its characteristics would have to be adjusted with a precision difficult to attain, and the slightest error could result in an increase in output noise power.

In the system shown in FIG. 5, the reference input signal 109 is processed by an adaptive filter 113. An adaptive filter differs from a fixed filter in that it automatically adjusts its own impulse response. Adjustment is accomplished through an algorithm that responds to an error signal dependent, among other things, on the filter's output. Thus, with the proper algorithm, the filter can operate under changing conditions and can readjust itself continuously to minimize the error signal.

The error signal used in an adaptive process depends on the nature of the application. In noise cancelling systems the practical objective is to produce 111, a system output $z=s+n_o-y$ that is a best fit in the least squares sense to the signal s. This objective is accomplished by feeding the system output back to the adaptive filter and adjusting the filter through an LMS adaptive algorithm to minimize total system output power. In an adaptive noise cancelling system, in other words 111, the system output serves as the error signal 112 for the adaptive process.

It might seem that some prior knowledge of the signal s or of the noises $n_o$ and $n_1$, would be necessary before the filter could be designed, or before it could adapt, to produce the noise cancelling signal y. A simple argument will show, however, that little or no prior knowledge of s, $n_o$, or $n_1$, or of their interrelationships, either statistical or deterministic, is required.

Assume that s, $n_o$, $n_1$, and y are statistically stationary and have zero means. Assume that s is uncorrelated with $n_o$ and $n_1$, and suppose that $n_1$ is correlated with $n_o$. The output 111 is $$z=s+n_o-y \tag{1}$$

Squaring, one obtains $$z^2=s^2+(n_o-y)^2 2s(n_o y). \tag{2}$$

Taking expectations of both sides of (2), and realizing that s is uncorrelated with $n_o$ and with y, yields $$E[z^2] = E[s^2] + E[(n_o - y)^2] + 2E[s(n_o - y)] \quad (3)$$
$$= E[s^2] + E[(n_o - y)^2].$$

The signal power $E(s^2)$ will be unaffected as the filter is adjusted to minimize $E(z^2)$. Accordingly, the minimum output power is $$\min E[(z^2)] = E[(S^2)] + \min E[(n_o-y)^2] \quad (4)$$

When the filter 113 is adjusted so that $E(z^2)$ is minimized, $E[(n_{o-y})^2]$ is, therefore, also minimized. The filter output y is then a best least squares estimate of the primary noise $n_o$. Moreover, when $E[(n_oy)^2]$ is minimized, $E[(z-s)^2]$ is also minimized, since, from (1), $$(z-s) = (n_o y). \quad (5)$$

Adjusting or adapting the filter to minimize the total output power is thus tantamount to causing the output z to be a best least squares estimate of the signal s for the given structure and adjustability of the adaptive filter and for the given reference input.

The adaptive noise cancelling circuit output z or 111, will contain the signal s plus noise. From (1), the output noise is given by $(n_o - y)$. Since minimizing $E[(z^2)]$ minimizes $E[(n_o - y)^2]$, minimizing the total output power minimizes the output noise power. Since the signal in the output remains constant, minimizing the total output power maximizes the output signal-to-noise ratio.

It is seen from (3) that the smallest possible output power is $E[(z^2)] = E[(s^2)]$. When this is achievable, $E[(z^2)] = E[(s^2)]$. When this is achievable, $E[(n_o-y)2] = 0$.

Therefore, $y = n_o$ and $z = s$. In this case, minimizing output power causes the output signal to be perfectly noise free.

These arguments can readily be extended to the case where the primary and reference inputs contain, in addition to $n_o$ and $n_1$, additive random noises uncorrelated with each other and with s, $n_o$, and $n_1$. They can also readily be extended to the case where $n_o$ and $n_1$ are deterministic rather than stochastic.

As indicated above, the summing junction 114 produces the adaptive noise cancelling circuit output 111 by subtracting the correlated signal component 115 between the primary signal 108 and the reference signal 109 from the primary signal 108.

Figure 6:
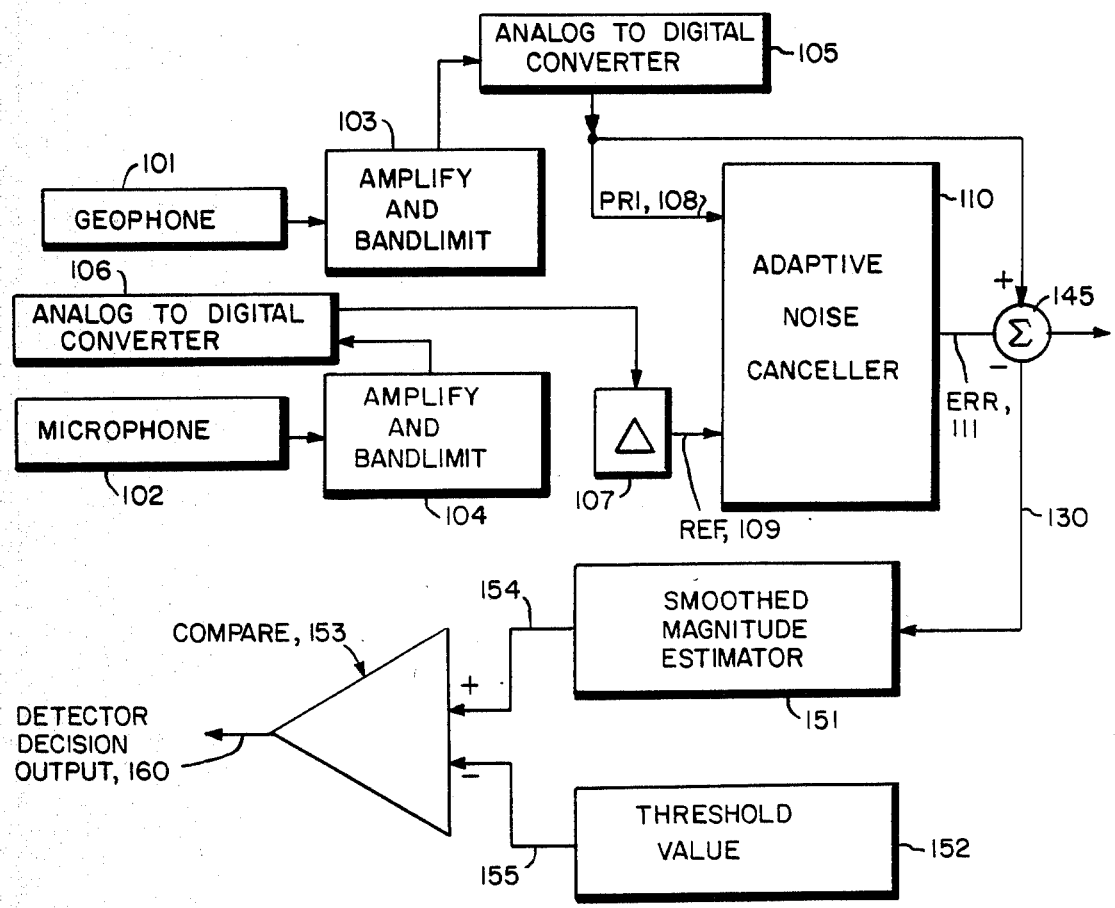
FIG. 6 is a functional block diagram of another embodiment of the invention.

FIG. 6 is a functional block diagram of another embodiment of the present invention which is slightly simpler than the embodiment depicted in FIG. 1. This embodiment uses elements of the seismic acoustic detector system depicted in FIG. 1 (since elements 101–111 of FIG. 6 are identical to elements with like numerals in FIG. 1). The error signal 111 is subtracted from the primary signal 108 producing signal 146. Signal 146 is identical to signal 115 which is shown in FIG. 5. However, signal 115 is not available with all noise canceller structures. Thus, if signal 115 is available it can be connected directly to squared magnitude estimator 151 and summing junction 145 can be deleted. If, however, signal 115 is not available, then signal 146 must be formed by summing junction 145 and connected to 151 as shown in FIG. 6.

The squared magnitude estimator 151 operates identically in the manner of squared magnitude estimators 121 and 122 described above in FIG. 1. Signal 153, the output of squared magnitude estimator 151, is an estimate of the power of components of the input seismic signal which are correlated with componets of the input acoustic signal.

The comparison circuit 154 of FIG. 6 is similar in function to comparison circuit 132 of FIG. 1. The power estimate 153 is compared to threshold value 152 to produce the two-valued detector decision output 160. As an example, a decision output 160 at logic 0 would indicate that the estimate of the power of the difference between the primary signal 108 and the error signal 11 was less than the threshold value 152 indicating that insufficient correlation exists between the input seismic and acoustic signals and therefore the event which caused the signals was not a low-flying aircraft. A decision output 160 at logic 1 would indicate that the estimate of the power of the difference between the primary signal 108 and the error signal 111 was greater than the threshold value 152 indicating that substantial correlation exists between the input seismic and acoustic signals and therefore the event which caused the signals was a low-flying aircraft.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A seismic-acoustic detection system for sensing the presence of low-flying aircraft which comprises:
   first sensing means for detecting a seismic signal generated by low-flying aircraft and outputting a primary signal response thereto;
   second sensing means for detecting an acoustic signal generated by said low-flying aircraft and outputting a reference signal response thereto;
   an adaptive noise canceller receiving said primary signal from said first sensing means and said reference signal from said second sensing means and generating a correlation signal, which indicates any correlation between the primary signal and the reference signal, said correlation being a correspondence in amplitudes and peaks which indicate a reciprocal relationship between the primary signal and the reference signal; and
   a signal processing means which receives the correlation signal from said adaptive noise canceller and generates a detection signal therefrom which indicates a presence of low-flying aircraft when the correlation signal indicates significant correlation between the primary and reference signals, said detection signal, otherwise indicating an absence of low-flying aircraft.

2. A seismic-acoustic detection system, as defined in claim 1, wherein said signal processing means comprises:
   a subtractor receiving said correlation signal from said adaptive noise canceller and said primary signal from said first sensing means and producing a detector signal by substracting said correlation signal from said primary signal;
   a smoothed squared magnitude estimate receiving, smoothing and squaring said detector signal from said subtractor and producing an output signal in response thereto,
   a threshold setting means producing a threshold value; and a comparison means receiving and comparing said threshold value from said threshold setting means with said output signal from said smoothed squared magnitude estimator and producing a detector signal in response thereto, said detector signal indicating a presence of low-flying aircraft.

3. A seismic-acoustic detection system, as defined in claim 1, wherein said adaptive noise canceller includes an internal subtractor which receives said primary signal from said first sensing means and subtracts therefrom said correlation signal to produce an error signal, and wherein said signal processing means comprises:
first and second squared magnitude estimators, said first squared magnitude estimator receiving and squaring said primary signal from said first sensing means and producing a primary signal power estimate;
said second squared magnitude estimator receiving and squaring said error signal from said internal subtractor and producing an error signal power estimate;
detector means receiving and comparing said primary signal power estimate from said first squared magnitude and said error signal power estimate from said second squared magnitude estimator and producing a detector signal;
threshold setting means producing a threshold value;
comparison means receiving and comparing said detector signal from said detector means and said threshold value from said threshold setting means, said comparison means producing a detector signal in response thereto, said detector signal indicating the presence of low-flying aircraft.

4. A seismic-acoustic detection system for sensing the presence of a low-flying aircraft, as defined in claim 3, wherein said detector means comprises:
a ratio performing arithmetic division of said primary signal power estimate by said error signal power estimate and producing said detector signal in response thereto.

5. A seismic-acoustic detection system for sensing the presence of a low-flying aircraft, as defined in claim 3, wherein said detector means comprises:
a subtractor subtracting said error signal power estimate from said primary signal power estimate and producing said detector signal in response thereto.

6. A seismic-acoustic detection system for sensing the presence of a low-flying aircraft which comprises:
first and second sensing means, said first sensing means detecting the seismic signal generated by low-flying aircraft and providing the first output signal response thereto;
said second sensing means detecting the acoustic signals generated by said low-flying aircraft and providing the second output signal response thereto;
correlating means correlating the outputs of said first and second sensing means and providing therefrom a correlation detection signal by measuring any similarity between the first and second output signals, said similarity occurring uniquely for low-flying aircraft and entailing a correspondence in amplitudes and peaks between the first and second output signals which indicate a reciprocal relationship between the seismic and acoustic signals of low-flying aircraft, said correlating means outputting an error signal by subtracting said correlation detection signal from the first output signal; and a detection circuit which receives said error signal from said correlating means and outputs a detection signal which indicates a pressure of low-flying aircraft when a correlation exists between detected seismic and acoustic signals.

7. A seismic-acoustic detection system for sensing the presence of a low-flying aircraft, as defined in claim 6, wherein said correlating means comprises:
first and second amplification circuits, said first amplification circuit developing a primary seismic signal by applying a gain at selected bandwidths to said first output signal response from said first sensing means;
said second amplification circuit applying a gain at selected bandwidths to said second output signal response from said second sensing means and producing an amplified acoustic signal;
a delay circuit developing a reference acoustic signal by applying a selected delay to said amplified acoustic signal from said second amplification circuit; and
an adaptive noise cancelling circuit receiving said primary seismic signal from said first amplification circuit and said reference acoustic signal from said delay circuit and generating the correlation detection signal by measuring any similarities between the primary seismic signal and the reference acoustic signal that indicates a correspondence between their amplitudes and peaks, and a reciprocal relationship between detected seismic and acoustic signals, said adaptive noise cancelling circuit producing said error signal by subtracting said correlation detection signal from said primary seismic signal.

8. A seismic-acoustic detection system for sensing the presence of a low-flying aircraft, as defined in claim 7, wherein said adaptive noise cancelling circuit comprises:
an adaptive filter receiving said reference acoustic signal from said delay circuit and said error signal as feedback from said adaptive noise cancelling circuit, and generating the correlation signal, said correlation signal containing those signal components which are correlated between said primary signal and said reference acoustic signal;
and a subtracting junction receiving said primary seismic signal from said first amplification circuit and said correlation signal from said adaptive filter, and generating said error signal by subtracting said correlation signal from said primary seismic signal.

9. A seismic-acoustic detection system for sensing the presence of a low-flying aircraft, as defined in claim 7, wherein said detecting circuit comprises a summing junction receiving said primary seismic signal generated by said first amplification circuit, and receiving said error signal generated by said adaptive noise cancelling circuit, and generating said detection signal by subtracting said error signal from said primary seismic signal.

10. A seismic-acoustic detection system for sensing the presence of a low-flying aircraft, as defined in claim 7 including first and second signal smoothing circuits, each said signal smoothing circuit performing a signal smoothing function and reducing the noise of received signals, said first signal smoothing circuit receiving said primary seismic signal from said first amplification circuit and sending the smoothed primary seismic signal to said detection circuit, said second signal smoothing circuit receiving said error signal from said adaptive noise cancelling circuit and sending the smoothed error signal to said detection circuit.

11. A seismic-acoustic detection system for sensing the presence of a low-flying aircraft, as defined in claim 10, including a variable detection decision circuit, said variable detector decision circuit allowing variation of distance thresholds for aircraft detection by said seismic-acoustic detection system.

12. A seismic-acoustic detection system for sensing the presence of a low-flying aircraft, as defined in claim 11, wherein said variable detection decision circuit comprises:

a third signal smoothing circuit receiving said detection signal from said detection circuit, and outputting a smoothed signal by performing a signal smoothing function to reduce noise in said detection signal;

a threshold circuit generating a threshold signal of a potential set at pre-selected magnitudes; and a subtraction circuit, said subtraction circuit generating a detection decision signal by subtracting the threshold signal received from said threshold circuit from said smoothed signal received from said third signal smoothing circuit.

* * * * *